United States Patent
Shiomi et al.

(10) Patent No.: US 9,546,758 B2
(45) Date of Patent: *Jan. 17, 2017

(54) BLANKET INSTALLATION METHOD AND BLANKET UNIT

(71) Applicant: IHI Corporation, Tokyo (JP)

(72) Inventors: Hiroshi Shiomi, Tokyo (JP); Masaki Takahashi, Tokyo (JP); Hidenori Suzuki, Tokyo (JP); Satoru Nagumo, Tokyo (JP); Akira Iwano, Tokyo (JP)

(73) Assignee: IHI CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/383,992

(22) PCT Filed: Feb. 27, 2013

(86) PCT No.: PCT/JP2013/055096
§ 371 (c)(1),
(2) Date: Sep. 9, 2014

(87) PCT Pub. No.: WO2013/136980
PCT Pub. Date: Sep. 19, 2013

(65) Prior Publication Data
US 2015/0048094 A1    Feb. 19, 2015

(30) Foreign Application Priority Data
Mar. 13, 2012 (JP) .................. 2012-055912

(51) Int. Cl.
B23P 19/04    (2006.01)
F17C 3/04    (2006.01)
(Continued)

(52) U.S. Cl.
CPC .................. *F17C 3/04* (2013.01); *B23P 19/04* (2013.01); *B65D 90/02* (2013.01); *F17C 3/022* (2013.01);
(Continued)

(58) Field of Classification Search
CPC ....... F17C 3/04; F17C 3/022; F17C 2203/035; F17C 2201/0104; F17C 2270/0136; F17C 2221/033; F17C 2201/052; F17C 2223/0161; F17C 2203/0629; F17C 2201/032; F17C 2223/033; F17C 2209/238; B65D 90/02; B23P 19/04; Y10T 29/49826
See application file for complete search history.

(56) References Cited

U.S. PATENT DOCUMENTS

| 2,278,062 A | 3/1942 | De Koharovich ............... 151/38 |
| 3,481,504 A | 12/1969 | Nelson ............................. 220/9 |

(Continued)

FOREIGN PATENT DOCUMENTS

| GB | 1 406 910 | 9/1975 |
| GB | 1 463 437 | 2/1977 |

(Continued)

OTHER PUBLICATIONS

International Search Report and Written Opinion mailed Apr. 23, 2013 in corresponding PCT International Application No. PCT/JP2013/055096.

(Continued)

*Primary Examiner* — Sarang Afzali
*Assistant Examiner* — Ruth G Hidalgo-Hernande
(74) *Attorney, Agent, or Firm* — Ostrolenk Faber LLP

(57) ABSTRACT

A blanket installation method includes: a transporting step of transporting a blanket unit (1), in which a blanket (2) and a transport jig (3) are integrally coupled, between an inner (Continued)

tank (60) and an outer tank (50) of a double shell structure tank in a suspended condition; and a mounting step of mounting the blanket unit (1) on a shell plate of the inner tank (60). The transport jig (3) is formed by attaching a blanket fixing pin (34) to a jig main body (3A) through pin coupling. The blanket (2) is held at the blanket fixing pin (34).

4 Claims, 9 Drawing Sheets

(51) Int. Cl.
 *F17C 3/02* (2006.01)
 *B65D 90/02* (2006.01)
(52) U.S. Cl.
 CPC .. *F17C 2201/0104* (2013.01); *F17C 2201/032* (2013.01); *F17C 2201/052* (2013.01); *F17C 2203/035* (2013.01); *F17C 2203/0629* (2013.01); *F17C 2209/238* (2013.01); *F17C 2221/033* (2013.01); *F17C 2223/0161* (2013.01); *F17C 2223/033* (2013.01); *F17C 2270/0136* (2013.01); *Y10T 29/49826* (2015.01)

(56) References Cited

U.S. PATENT DOCUMENTS

| | | | | |
|---|---|---|---|---|
| 3,861,021 A | * | 1/1975 | Yamamoto | B63B 25/16 114/74 A |
| 3,935,957 A | * | 2/1976 | Hasegawa | F17C 3/022 220/1.5 |
| 3,970,210 A | | 7/1976 | Katsuta | 220/9 |
| 3,987,925 A | * | 10/1976 | Sattelberg | B65D 90/06 220/560.08 |
| 4,207,827 A | * | 6/1980 | Gondouin | B63B 9/06 114/74 A |
| 4,327,554 A | * | 5/1982 | Patil | B65D 90/24 137/565.17 |
| 4,747,513 A | | 5/1988 | Betille et al. | 220/452 |
| 7,682,117 B2 | | 3/2010 | Holt et al. | 411/156 |
| 2005/0053692 A1 | * | 3/2005 | Eichlseder | B29C 45/461 425/563 |
| 2013/0255059 A1 | | 10/2013 | Takahashi et al. | 29/428 |

FOREIGN PATENT DOCUMENTS

| | | | |
|---|---|---|---|
| GB | 1 498 041 | | 1/1978 |
| GB | 1 498 042 | | 1/1978 |
| JP | B-53-016123 | | 5/1978 |
| JP | 55-020922 | | 2/1980 |
| JP | 58-94694 | | 6/1983 |
| JP | S59231297 | * | 6/1983 |
| JP | 59-021199 | | 2/1984 |
| JP | 59-231297 | | 12/1984 |
| JP | U-A-60-173796 | | 11/1985 |
| JP | 61-165097 | | 7/1986 |
| JP | Y-63-009748 | | 3/1988 |
| JP | Y-63-029994 | | 8/1988 |
| JP | 63-56385 | | 11/1988 |
| JP | A-03-181698 | | 8/1991 |
| JP | A-08-121695 | | 5/1996 |
| JP | A-2002-070312 | | 3/2002 |
| JP | 2003-227596 | | 8/2003 |
| JP | A-2004-043076 | | 2/2004 |
| SU | 897120 A3 | | 1/1982 |
| SU | 1637669 A3 | | 3/1991 |
| WO | WO 2012/063937 A1 | | 5/2012 |

OTHER PUBLICATIONS

Office Action dated Mar. 19, 2015 issued in corresponding Chinese Patent Application No. 201380013415.6 with English translation.
Search and Examination Report dated Apr. 27, 2015 issued in corresponding Singapore Patent Application No. 11201405581P.
Office Action dated Apr. 30, 2015 issued in corresponding Australian Patent Application No. 2013233560.
Office Action dated Dec. 21, 2015 issued in corresponding Russian Patent Application No. 2014140897 with English translation.
International Search Report and Written Opinion mailed Jan. 31, 2012 in corresponding International Application No. PCT/JP2011/076060 with English translation of only a part of Search Report).
Office Action mailed Feb. 4, 2014 in corresponding Japanese Patent Application No. 2012-542988 with English translation.
Office Action mailed Apr. 7, 2015 in corresponding U.S. Appl. No. 13/881,885.
Final Office Action mailed Sep. 23, 2015 in corresponding U.S. Appl. No. 13/881,885.
Notice of Allowance mailed Feb. 25, 2016 in corresponding U.S. Appl. No. 13/881,885.

* cited by examiner

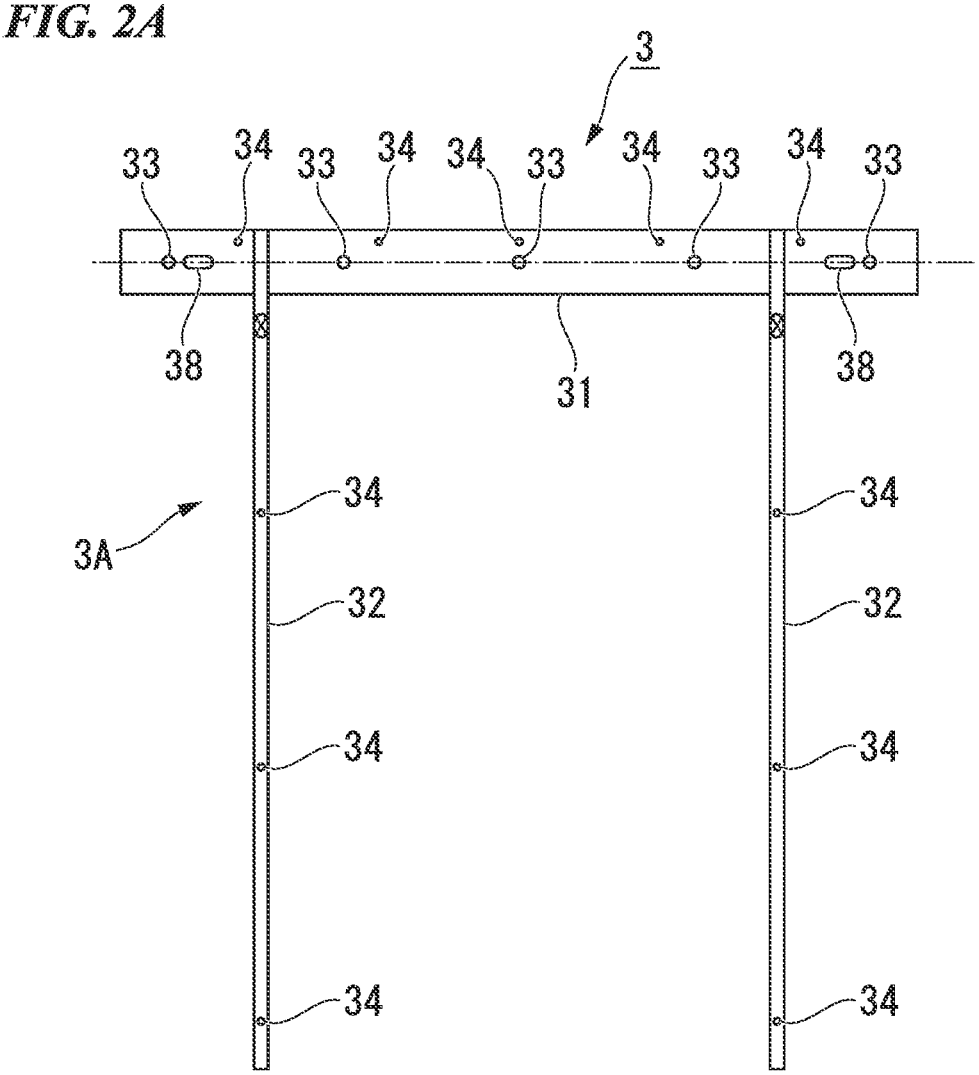

BLANKET INSTALLATION METHOD AND BLANKET UNIT

CROSS-REFERENCE TO RELATED APPLICATIONS

The present application is a 35 U.S.C. §§371 national phase conversion of PCT/JP2013/055096, filed Feb. 27, 2013, which claims priority to Japanese Patent Application No. 2012-055912, filed Mar. 13, 2012, the contents of both of which are incorporated herein by reference. The PCT International Application was published in the Japanese language.

TECHNICAL FIELD

The present invention relates to a blanket installation method and a blanket unit.

BACKGROUND ART

In the related art, as a tank configured to store a cryogenic liquid such as liquefied natural gas (LNG) or the like, a double shell structure tank constituted by an outer tank and an inner tank is known. In such a double shell structure tank, granular perlite serving as a cold insulation agent is filled in a space between the outer tank and the inner tank to form a cold insulation layer (see Patent Document 1). In addition, in order to prevent collapse of the inner tank due to a pressure difference between the outside (the cold insulation layer) and the inside of the inner tank, a resilient blanket (hereinafter, simply referred to as a blanket) is installed at a shell plate (an outer wall surface) of the inner tank.

CITATION LIST

Patent Document

[Patent Document 1] Japanese Unexamined Patent Application, First Publication No. S61-165097

SUMMARY OF INVENTION

Technical Problem

In the related art, after assembly of the outer tank and the inner tank, a plurality of anchor pins are attached to the shell plate of the inner tank, and the blanket is stuck and fixed to these anchor pins. However, the anchor pin is frequently broken, dropped, or the like during the fixing operation of the blanket, which necessitates repair operations, and thus operation efficiency is decreased. In addition, since an attachment operation of the anchor pin having a length of about 0.3 m to 0.4 m needs to be performed in a small space of about 1.0 m to 1.2 m between the inner and outer tanks, the anchor pin may be damaged during the attachment operation, and there is a need to provide sufficient consideration for safety of the operation.

In consideration of the above-mentioned circumstances, the present invention is directed to improving operation efficiency and safety during an installation operation of a blanket.

Solution to Problem

A blanket installation method according to the present invention has a transporting step of transporting a blanket unit, in which a blanket and a transport jig are integrally coupled, between an inner tank and an outer tank of a double shell structure tank in a suspended condition; and a mounting step of mounting the blanket unit on a shell plate of the inner tank. The transport jig is formed by attaching a blanket fixing pin to a jig main body through pin coupling, and the blanket is held at the blanket fixing pin.

In addition, in the blanket installation method, the blanket fixing pin may be inserted through a hole section formed in the jig main body and held by a pair of self-lock washers at both sides with the hole section sandwiched therebetween. In addition, as the jig main body is sandwiched between the pair of self-lock washers in a state in which the pair of self-lock washers hold the blanket fixing pin, the blanket fixing pin may be attached to the jig main body through pin coupling.

A blanket unit of the present invention has a blanket installed between an inner tank and an outer tank of a double shell structure tank. The blanket unit has a transport jig configured to hold and transport the blanket, and the blanket integrally coupled to the transport jig. In addition, the transport jig is formed by attaching a blanket fixing pin to a jig main body through pin coupling, and the blanket is held at the blanket fixing pin.

In addition, in the blanket unit, the blanket fixing pin may be inserted through a hole section formed in the jig main body and held by a pair of self-lock washers at both sides with the hole section sandwiched therebetween. In addition, as the jig main body is sandwiched between the pair of self-lock washers in a state in which the pair of self-lock washers hold the blanket fixing pin, the blanket fixing pin may be attached to the jig main body through pin coupling.

Advantageous Effects of Invention

According to the blanket installation method and the blanket unit of the present invention, there is no need to attach the anchor pin to the shell plate of the inner tank as in the related art. For this reason, damage of the anchor pin and problems in safety during the installation operation of the blanket can be removed, and operation efficiency and safety can be improved.

In addition, the transport jig is formed by attaching the blanket fixing pin to the jig main body through pin coupling. For this reason, for example, when the blanket unit is suspended between the inner tank and the outer tank to be mounted on the shell plate of the inner tank, if an excessive force is applied, by the weight of the blanket, an impact, or the like, to the blanket fixing pin holding the blanket, an end section of the blanket fixing pin opposite to the pin-coupled end section is displaced by the force. Accordingly, the blanket fixing pin can absorb the force, or transmit the force to the jig main body. Accordingly, inconvenience such as breakage of the blanket fixing pin and dropping from the jig main body is avoided. Accordingly, since the breakage of the blanket fixing pin is also prevented, operation efficiency and safety can be improved.

BRIEF DESCRIPTION OF DRAWINGS

FIG. 2A is a front view of the transport jig for describing the assembly method of the blanket unit according to the present invention.

DESCRIPTION OF EMBODIMENTS

Hereinafter, an embodiment of the present invention will be described with reference to the accompanying drawings.

First, a blanket unit 1 and an assembly method thereof according to the embodiment will be described with reference to FIGS. 1A to 3B. As shown in FIGS. 2A and 2B, in order to transport the blanket unit 1 of the embodiment in a state in which a blanket 2 formed of glass wool that has a small tensile strength and is likely to be broken due to the weight thereof is suspended, the blanket unit 1 is configured to integrally couple the blanket 2 with a transport jig 3.

Figure 1A:
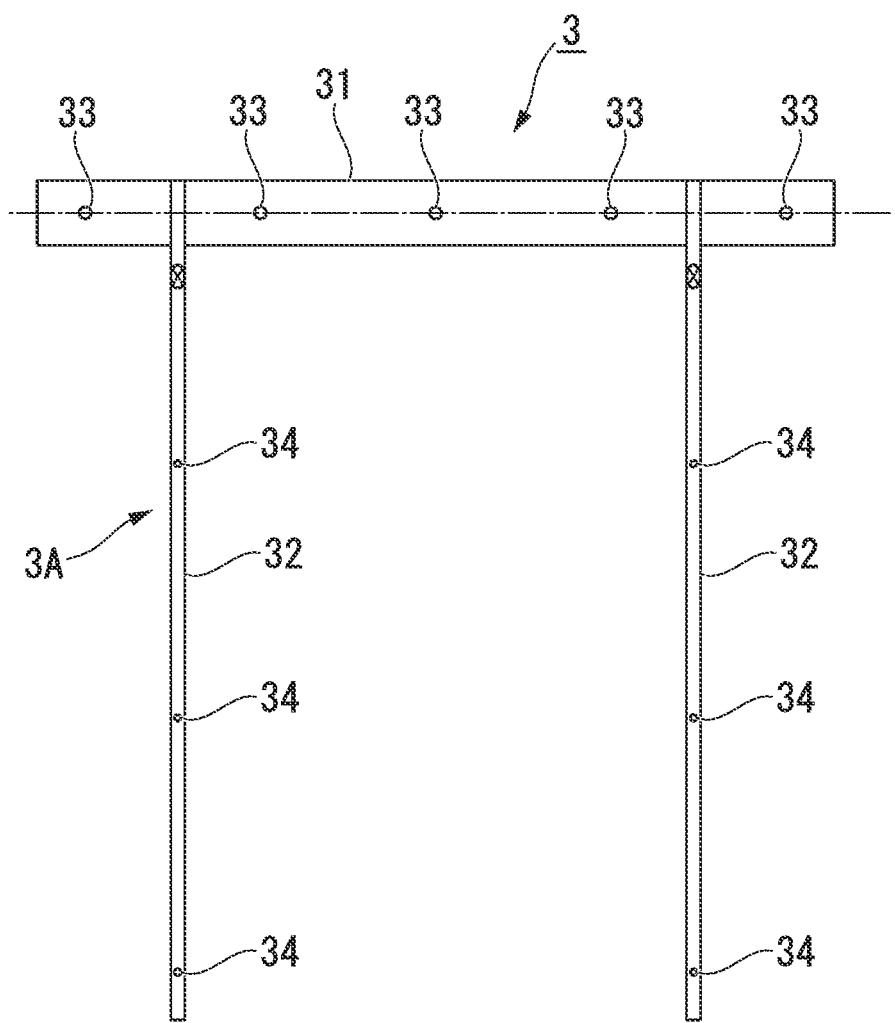
FIG. 1A is a front view of a transport jig for describing an assembly method of a blanket unit according to the present invention.
Figure 2B:
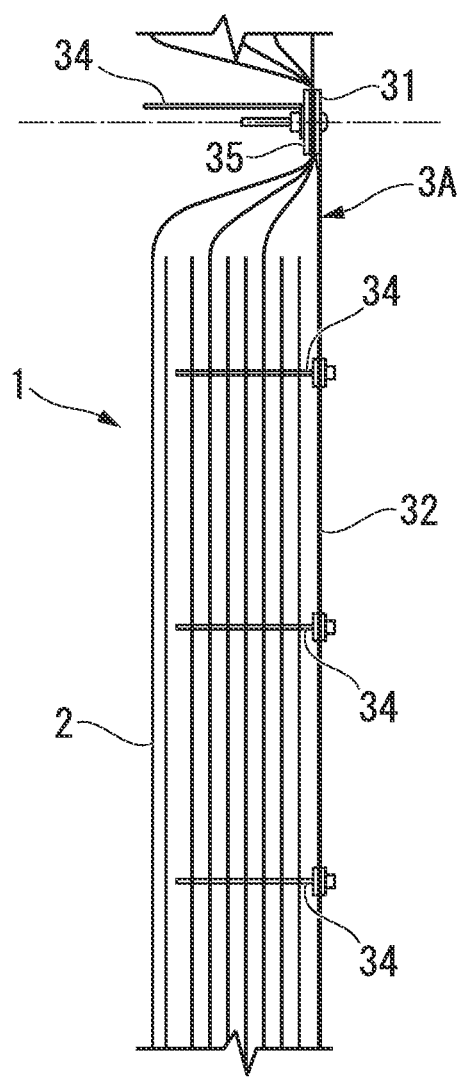
FIG. 2B is a cross-sectional view of the blanket unit for describing the assembly method of the blanket unit according to the present invention.

FIG. 1A is a front view of the transport jig 3 that constitutes the blanket unit 1. As shown in FIG. 1A, the transport jig 3 is constituted by a support plate 31 formed of aluminum in a rectangular shape, and belt-shaped stainless steel plates (hereinafter referred to as a strap) 32 connected to both sides of the support plate 31. Then, a jig main body 3A is formed by the support plate 31 and the pair of straps 32. A plurality of transporting bolts 33 are inserted into the support plate 31 at certain intervals to pass through the support plate 31.

Figure 3A:
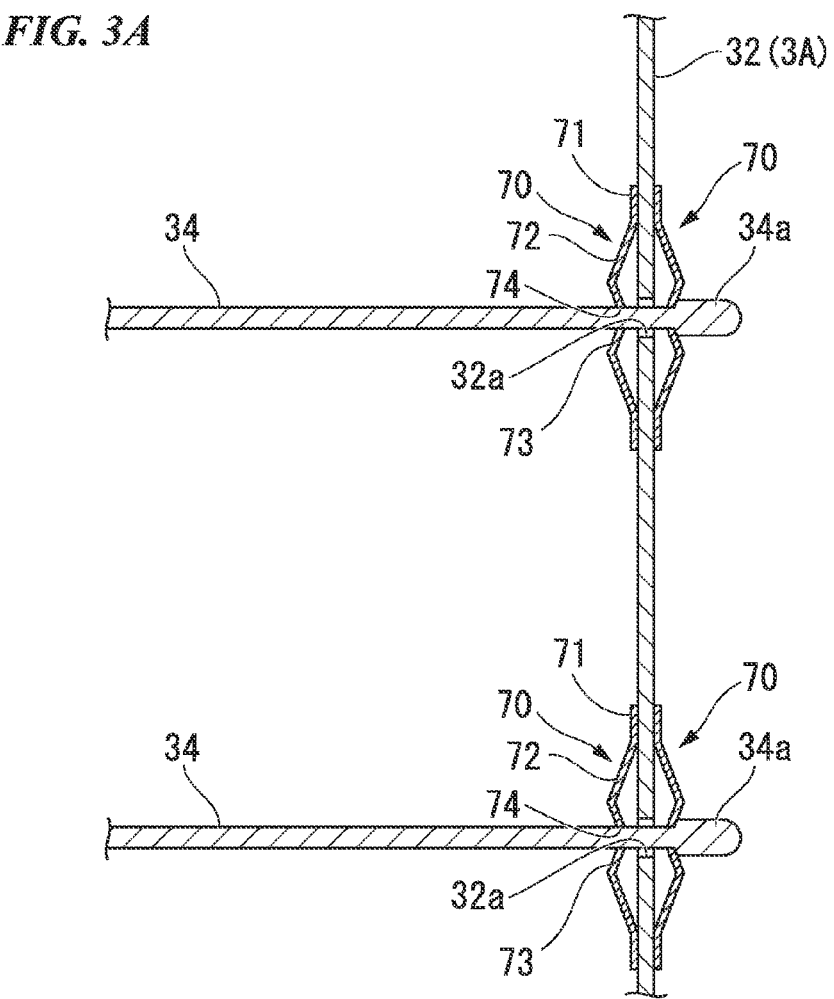
FIG. 3A is a side cross-sectional view for describing pin coupling of a blanket fixing pin with respect to the strap.
Figure 3B:
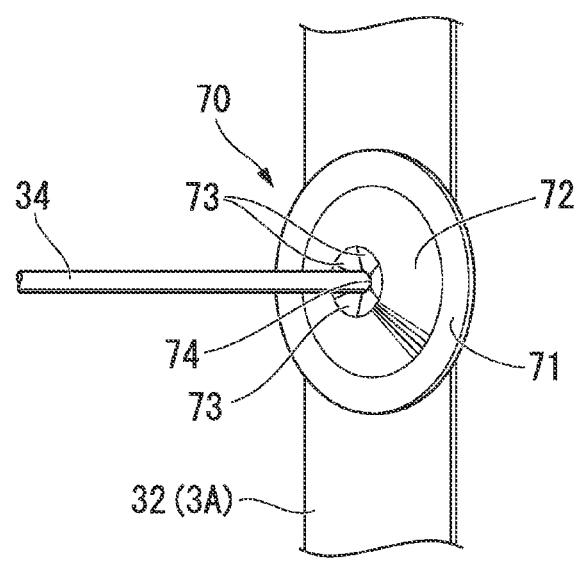
FIG. 3B is a perspective view for describing the pin coupling of the blanket fixing pin with respect to the strap.

In addition, as shown in FIG. 3A, a plurality of attachment holes 32a (hole sections) are formed in each of the straps 32 at certain intervals in a lengthwise direction thereof, and a blanket fixing pin 34 is inserted into and attached to each of the attachment holes 32a. As shown in FIGS. 3A and 3B, one end section side of the blanket fixing pin 34 is attached to the strap 32 (the jig main body 3A) through pin coupling. The blanket fixing pin 34 is a rod-shaped member having a diameter sufficiently smaller than an inner diameter of the attachment hole 32a, and as shown in FIG. 3A, a large diameter section 34a is formed in one end section of the blanket fixing pin 34 such that the large diameter section 34a has a diameter larger than that of the other end side. The large diameter section 34a has a length of, for example, about 5 mm and a diameter sufficiently larger than that of the attachment hole 32a, and thus functions as a stopper with respect to the attachment hole 32a.

In addition, a pair of self-lock washers 70 are fitted onto the blanket fixing pin 34 from the outside thereof, and the blanket fixing pin 34 is held by the pair of self-lock washers 70 at both sides with the attachment hole 32a sandwiched therebetween. Then, as the strap 32 (the jig main body 3A) is sandwiched between the pair of self-lock washers 70 in a state in which the pair of self-lock washers 70 hold the blanket fixing pin 34, the blanket fixing pin 34 is attached to the strap 32 through pin coupling.

As shown in FIGS. 3A and 3B, the self-lock washer 70 is an annular-disk-shaped member, and has an annular-disk-shaped outer circumferential section 71 abutting the strap 32, a frusto-conical protrusion 72 formed inside the outer circumferential section 71 and protruding toward one surface of the outer circumferential section 71, and a plurality of (in the embodiment, 6) flexible pieces 73 formed inside the protrusion 72. As shown in FIG. 3B, as the flexible pieces 73 are formed in substantially a fan shape formed by dividing an annular disk into a plurality of pieces and a distal end side of each of the flexible pieces 73 is cut out, an insertion hole 74 is formed in these distal end sides. The insertion hole 74 has a diameter smaller than that of the other end side of the blanket fixing pin 34.

In the self-lock washer 70 having the above-mentioned configuration, as the other end side of the blanket fixing pin 34 is inserted into the insertion hole 74, the flexible piece 73 is bent (elastically deformed) to allow the insertion of the blanket fixing pin 34, and the blanket fixing pin 34 is held by the flexible pieces 73 according to elastic recovery after that.

In pin coupling the blanket fixing pin 34 to the strap 32 using the self-lock washers 70, first, one of the self-lock washers 70 is fitted onto the large diameter section 34a side of the blanket fixing pin 34. That is, the insertion hole 74 of the self-lock washer 70 is fitted onto the other end side of the blanket fixing pin 34 as is described above, and the self-lock washer 70 is further pushed to move toward the large diameter section 34a. Here, the protrusion 72 of the self-lock washer 70 protrudes toward the large diameter section 34a, and simultaneously, the self-lock washer 70 is pushed toward the large diameter section 34a such that the flexible piece 73 comes substantially in contact with the large diameter section 34a.

Next, the other end side of the blanket fixing pin 34 is inserted into the attachment hole 32a of the strap 32, and the outer circumferential section 71 of the self-lock washer 70 previously fitted onto the blanket fixing pin 34 abuts the strap 32.

After that, another self-lock washer 70 is fitted onto the other end side of the blanket fixing pin 34 and pushed to abut the strap 32. Here, for example, as shown in FIG. 3A, the protrusion 72 protrudes toward an opposite side of the large diameter section 34a, and thus the outer circumferential section 71 abuts the strap 32. However, the self-lock washer 70 may be fitted onto the blanket fixing pin 34 in a reverse direction.

In this way, the blanket fixing pin 34 fitted into the strap 32 is held by the pair of self-lock washers 70, and in this state, the strap 32 (the jig main body 3A) is sandwiched between the pair of self-lock washers 70. As a result, the blanket fixing pin 34 can be attached to the strap 32 (the jig main body 3A) through pin coupling.

Here, the pin coupling means coupling in which, when an excessive force is applied, rotation at the coupling section becomes possible, which is different from, for example, a rigid coupling (rigid joining) in a construction structure in which a pillar and a beam are rigidly connected in an integrated state, and when an excessive force is applied, the pillar or the beam is broken before the coupling section (joining section) is broken. Accordingly, in the above-mentioned pin coupling, since the rotation at the coupling section becomes possible when the excessive force is applied, the excessive force is absorbed by the rotation, or the force is absorbed by being transmitted between the members.

In the blanket fixing pin 34 shown in FIGS. 3A and 3B, while the one end side is held at the strap 32 (the jig main body 3A) by the pair of self-lock washers 70, the one end side is merely inserted through the attachment hole 32a of the strap 32, and the flexible pieces 73 of the self-lock washer 70 can be elastically deformed. Accordingly, since the blanket fixing pin 34 is attached to the strap 32 such that the other end side can be displaced (rotated), the blanket fixing pin 34 is attached to the strap 32 through the pin coupling rather than the rigid coupling.

Further, as the attachment method of the blanket fixing pin 34 to the strap 32, in addition to the pin coupling using the self-lock washer 70 or pin coupling by a screw (to be described later), for example, welding such as stud welding or the like is considered. However, since the welding has varying joining quality according to a welding engineer and is rigid coupling (rigid joining) as mentioned above rather than the pin joining, when an excessive force is applied to the blanket fixing pin 34 upon suspension (to be described later) of the blanket unit 1 or the like, the welding place may be broken or the blanket fixing pin 34 may be dropped from the strap 32.

As described above, as shown in FIG. 1B, as the blanket 2 is pushed with respect to the transport jig 3, in which the blanket fixing pin 34 is attached to the strap 32 through the pin coupling, in a state where the transport jig 3 faces the blanket 2, the blanket 2 is stuck to the transporting bolt 33 and the blanket fixing pin 34 of the transport jig 3. Then, as shown in FIG. 1C, as a support plate 35 having the same shape as the support plate 31 is disposed to oppose the support plate 31 with the blanket 2 sandwiched therebetween and pushed thereto, the transporting bolt 33 is inserted to pass through the support plate 35 while compressing the blanket 2. Further, as the transporting bolt 33 is fastened using a washer 36 and a nut 37 from the support plate 35 side, the support plate 31 and the support plate 35 are fixed with the blanket 2 sandwiched therebetween.

Next, as shown in FIGS. 2A and 2B, the plurality of blanket fixing pins 34 are attached to the support plate 35 through pin coupling at certain intervals, as in attachment to the strap 32.

After that, as two through-holes 38 passing from the support plate 35 to the support plate 31 are formed at both end sections of the support plates 31 and 35, the blanket unit 1 of the embodiment in which the blanket 2 and the transport jig 3 are integrally coupled is completed. Further, assembly of the above-mentioned blanket unit 1 may be performed at a horizontal place of a site (a construction site of the double shell structure tank) or may be performed at a factory or the like.

Next, the blanket installation method according to the embodiment will be described with reference to FIGS. 4 to 5B. Further, in FIG. 4, reference numeral 50 designates an outer tank of the double shell structure tank, reference numeral 51 designates a working crane installed at a roof 50a of the outer tank 50, reference numeral 60 designates an inner tank of the double shell structure tank, and reference numeral 61 designates an anchor rod which is previously stud-welded to a shell plate of the inner tank 60. The plurality of anchor rods 61 are attached at certain intervals in a circumferential direction and a height direction of the shell plate of the inner tank 60.

Figure 4:
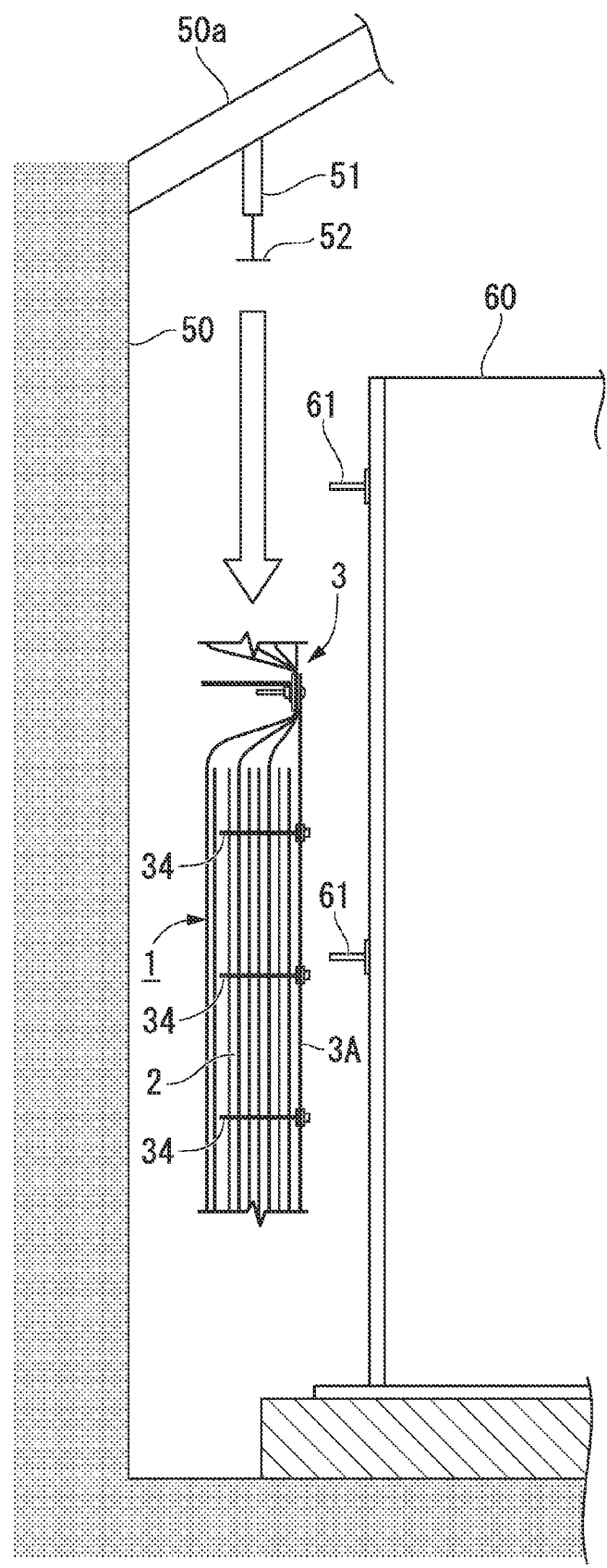
FIG. 4 is a view for describing a blanket installation method according to the present invention.

First, as shown in FIG. 4, the previously assembled blanket unit 1 is transported in a suspended condition between the outer tank 50 and the inner tank 60 using the working crane 51 (a transporting step). Here, the blanket unit 1 can be easily transported in the suspended condition merely by hooking a hook 52 of the working crane 51 to the transporting bolt 33 of the blanket unit 1.

Here, since the blanket 2 is held (pinned) at the transport jig 3 by the blanket fixing pin 34 attached to the strap 32, the blanket 2 is not broken due to the weight thereof even when the blanket 2 is transported in the suspended condition. In addition, since the blanket fixing pin 34 is attached to the strap 32 (the jig main body 3A) by the pin coupling, even when an excessive force is applied to the blanket fixing pin 34 by the weight of the blanket 2 or an impact or the like upon collision with the shell plate of the inner tank 60 during transportation, the blanket fixing pin 34 is easily deformed at the other end section side opposite to the pin-coupled one end section side. Accordingly, the blanket fixing pin 34 can absorb the force or transmit the force to the strap 32. Accordingly, inconvenience in which the blanket fixing pin 34 is broken and dropped from the strap 32 can be avoided.

Figure 5A:
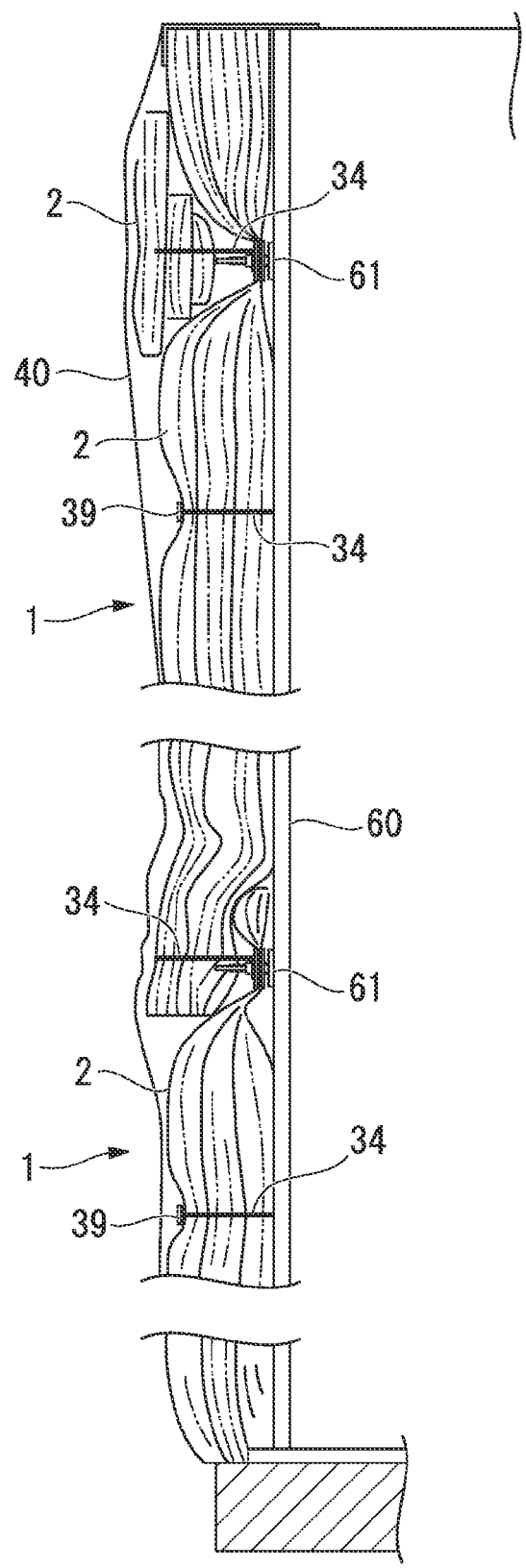
FIG. 5A is a side cross-sectional view for describing the blanket installation method according to the present invention.

Then, as the anchor rod 61 is fastened by a nut after the anchor rod 61 is inserted through the through-hole 38 of the blanket unit 1, the blanket unit 1 is mounted on the shell plate of the inner tank 60 (a mounting step). The mounting operation of the blanket unit 1 is firstly performed in a lower side of the inner tank 60, and after completion of the mounting operation in the lower side of the inner tank 60, the mounting operation in an upper side of the inner tank 60 is performed. FIGS. 5A and 5B are views showing a state in which the blanket unit 1 is mounted on the shell plate of the inner tank 60.

Figure 5B:
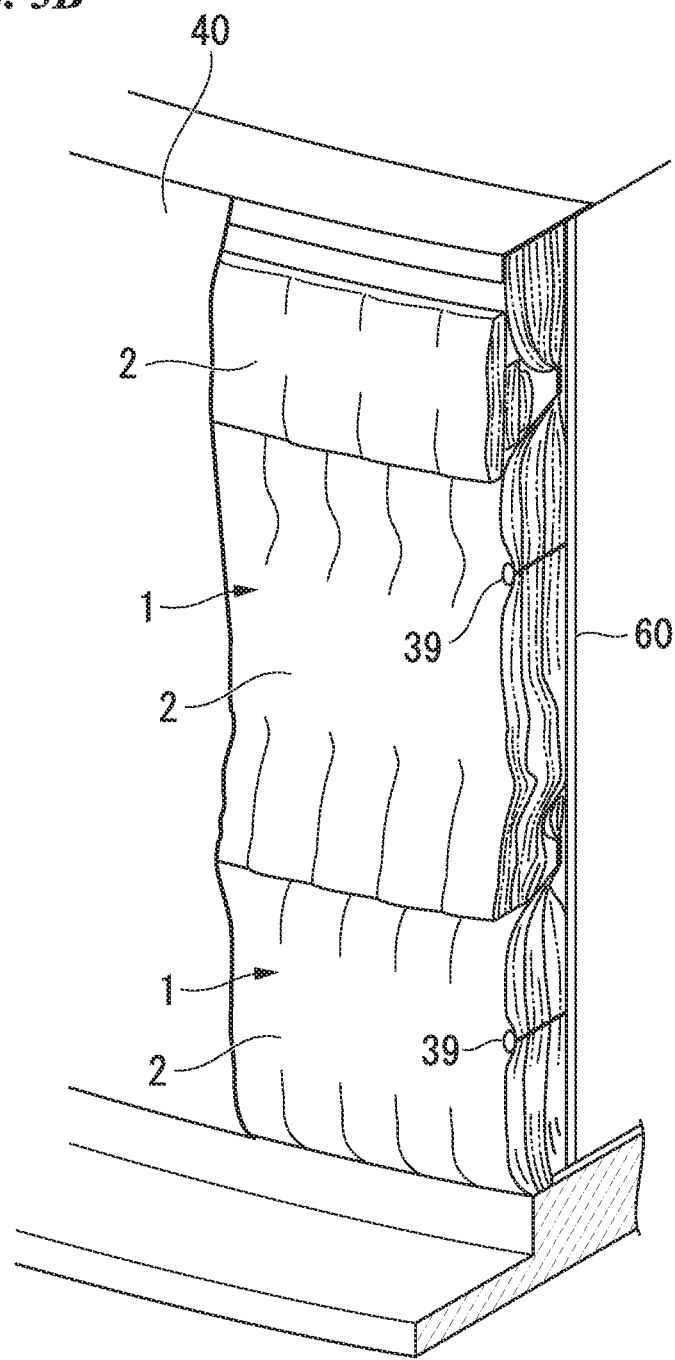
FIG. 5B is a perspective view for describing the blanket installation method according to the present invention.

As shown in FIGS. 5A and 5B, after the blanket unit 1 is attached to the anchor rod 61, for example, as a washer 39 having the same configuration as the self-lock washer 70 is fitted from the outside to the distal end of the blanket fixing pin 34 installed at the strap 32 of each of the blanket units 1, each of the blankets 2 is held at and fixed to the strap 32. In addition, the lower end portion of the blanket 2 in the upper blanket unit 1 is pushed and fixed to the blanket fixing pin 34 installed at the support plate 35 in the lower blanket unit 1.

The upper end portion of the blanket 2 in the upper blanket unit 1 is adhered to the upper section of the inner tank 60 using an adhesive agent or the like. Further, the blanket 2 suspended from the upper section of the inner tank 60 is pushed and fixed to the blanket fixing pin 34 installed at the support plate 35 in the upper blanket unit 1. Finally, as each of the blanket units 1 is covered by a cover member 40, an installation operation of the blanket 2 is terminated.

As described above, according to the blanket unit 1 and the blanket installation method of the embodiment, in a process of assembling the blanket unit 1, a fixing operation of the blanket 2 by the blanket fixing pin 34 is terminated. For this reason, the blanket fixing pin 34 is not broken during the blanket installation operation, and as a result, there is no need to perform the repair operation of the blanket fixing pin 34, thereby improving operation efficiency. In addition, as described in the related art, since there is no need to perform the attachment operation of the blanket fixing pin 34 in the small space between the inner and outer tanks, safety is also improved.

In addition, since the blanket fixing pin 34 is attached to the strap 32 or the support plate 31 (the jig main body 3A) through the pin coupling, when the blanket unit 1 is suspended between the inner tank 60 and the outer tank 50 to be mounted on the shell plate of the inner tank 60, even if an excessive force is applied to the blanket fixing pin 34 by the weight of the blanket 2 or the impact upon collision with the shell plate of the inner tank 60 during the transportation, as described above, the blanket fixing pin 34 absorbs the force, or transmit the force to the strap 32. For this reason, inconvenience in which the blanket fixing pin 34 is broken and dropped from the strap 32 is avoided.

Accordingly, for example, in comparison with the case in which the blanket fixing pin 34 is attached to the strap 32 or the support plate 31 (the jig main body 3A) by the rigid coupling (rigid joining) such as stud welding or the like, it is possible to prevent damage of the blanket fixing pin 34 or the coupling section thereof. For this reason, operation efficiency and safety can be improved.

Further, the present invention is not limited to the embodiment but may be variously modified without departing from the spirit of the present invention. That is, all shapes, combinations, or the like, of the components provided in the above-mentioned embodiment are examples, and additions, omissions, substitutions and other modifications of the configurations may be made without departing from the spirit of the present invention. The present invention is not limited to the above-mentioned description but is limited only by the range of the accompanying claims.

For example, in the embodiment, while the self-lock washer having the configuration shown in FIGS. 3A and 3B is used, the self-lock washer is not limited to the above-mentioned configuration but the configuration may be used as long as the configuration has at least an annular portion and a plurality of flexible pieces formed at an inner circumferential side thereof.

In addition, while the attachment of the blanket fixing pin 34 with respect to the strap 32 or the support plate 31 (the jig main body 3A) by the pin coupling is performed by the pair of self-lock washers 70 shown in FIGS. 3A and 3B, for example, fastening (coupling) by a screw may also be employed as the pin coupling.

In this case, a male screw section is formed at one end side of the blanket fixing pin 34, and the male screw section is inserted through, for example, the attachment hole 32a of the strap 32. Then, as nuts are disposed at both sides of the attachment hole 32a, i.e., both sides of the strap 32, and the nuts are threadedly engaged with the male screw section, the blanket fixing pin 34 can be attached to the strap 32 by the pin coupling.

When the nuts are threadedly engaged in this way, a slight gap formed between the male screw section of the blanket fixing pin 34 and the female screw section of the nut allows displacement of the blanket fixing pin 34. As a result, the blanket fixing pin 34 is attached to the strap 32 by the pin coupling.

Further, in order to further facilitate displacement (rotation) of the other end side (an opposite side of the side at which a male screw is formed) of the blanket fixing pin 34 with respect to the strap 32, an appropriate gap may be formed between the nut and the strap 32 by not closely contacting the pair of nuts with the strap 32.

Figure 1B:
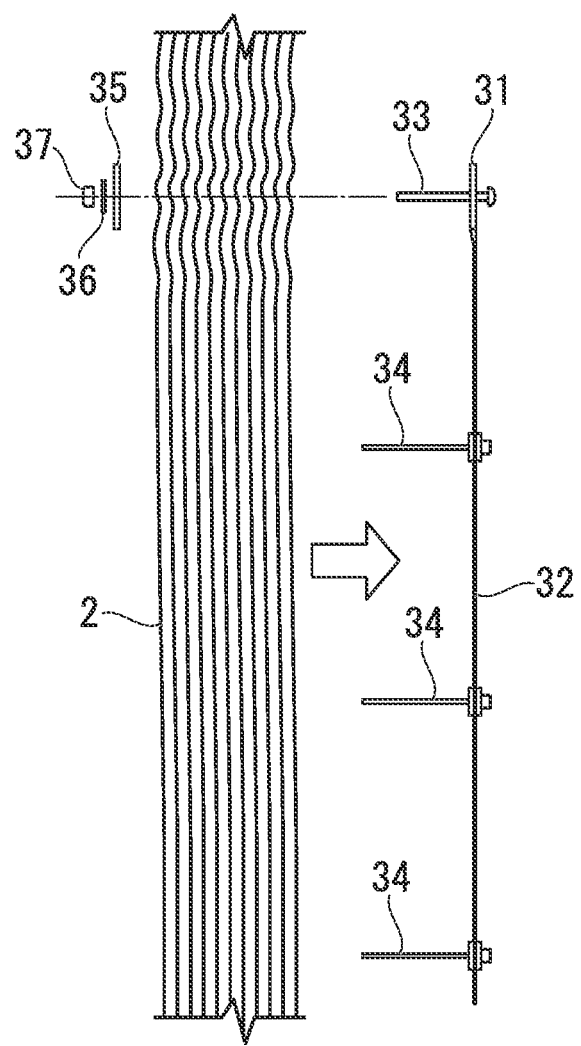
FIG. 1B is a cross-sectional view of a blanket and a strap for describing the assembly method of the blanket unit according to the present invention.
Figure 1C:
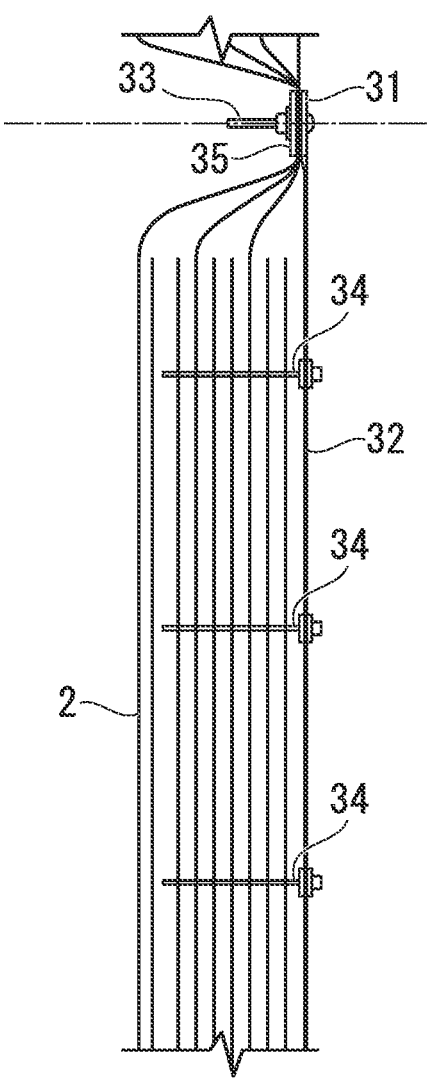
FIG. 1C is a cross-sectional view of the blanket and the strap for describing the assembly method of the blanket unit according to the present invention.

In addition, in the embodiment, while the transport jig 3 having the configuration as shown in FIGS. 1A to 1C is exemplified, the configuration of the transport jig 3 is not limited thereto but another configuration may be employed as long as the blanket 2 that is likely to be broken due the weight thereof can be transported in a state in which the blanket 2 is suspended.

Further, in the embodiment, while the case in which the blanket units 1 of the upper and lower two stages are installed at the shell plate of the inner tank 60 is exemplified, the present invention is not limited thereto but blanket units 1 of one stage or three stages or more may be installed according to limitations on assembly/transportation of the blanket unit.

INDUSTRIAL APPLICABILITY

According to the blanket installation method and the blanket unit according to the present invention, operation efficiency and safety during the installation of the blanket can be improved.

REFERENCE SIGNS LIST

1: blanket unit
2: blanket
3: transport jig
3A: jig main body
31, 35: support plate
32: strap
33: transporting bolt
34: blanket fixing pin
50: outer tank
51: working crane
60: inner tank
61: anchor bolt
70: self-lock washer

What is claimed is:

1. A blanket installation method comprising:
a transporting step of transporting a blanket unit, in which a blanket and a transport jig are integrally coupled, between an inner tank and an outer tank of a double shell structure tank in a suspended condition; and
a mounting step of mounting the blanket unit on a shell plate of the inner tank,
wherein the transport jig is formed by attaching a blanket fixing pin to a jig main body through pin coupling;
the blanket is held at the blanket fixing pin;
the blanket fixing pin is inserted through a hole section formed in the jig main body and held by a pair of self-lock washers at both sides with the hole section sandwiched therebetween;
each of the pair of self-lock washers has an annular member and a plurality of flexible pieces formed at an inner circumferential side of the annular member;
as the jig main body is sandwiched between the pair of self-lock washers in a state in which the pair of self-lock washers hold the blanket fixing pin, the blanket fixing pin is attached to the jig main body through pin coupling;
the blanket fixing pin is held by the pair of self-lock washers so that the blanket fixing pin is attached to the jig main body with a first end side of the blanket fixing pin being capable of being displaced;
the jig main body of the transport jig includes a strap which is band-shaped and extends in a vertical direction when the blanket unit is inserted between the inner tank and the outer tank;
the blanket fixing pin includes a large diameter section formed in a second end side of the blanket fixing pin, the second end side being opposite to the first end side, such that the large diameter section has a diameter larger than that of the first end side of the blanket fixing pin;
the pair of self-lock washers includes a first self-lock washer and a second self-lock washer; and
the first self-lock washer is fitted onto the large diameter section of the blanket fixing pin, the first end side of the blanket fixing pin is inserted into an attachment hole of the strap, an outer circumferential section of the first self-lock washer abuts the strap, and the second self-lock washer is fitted onto the first end side of the blanket fixing pin and abuts the strap.

2. The blanket installation method according to claim 1, wherein when the blanket fixing pin is inserted into an insertion hole of the self-lock washer, the plurality of flexible pieces are elastically deformed to allow the insertion of the blanket fixing pin, and then the blanket fixing pin is held by the plurality of flexible pieces according to elastic recovery of the plurality of flexible pieces.

3. A blanket unit having a blanket installed between an inner tank and an outer tank of a double shell structure tank, the blanket unit comprising:
   a transport jig configured to hold and transport the blanket; and
   the blanket integrally coupled to the transport jig,
   wherein the transport jig is formed by attaching a blanket fixing pin to a jig main body through pin coupling;
   the blanket is held at the blanket fixing pin;
   the blanket fixing pin is inserted through a hole section formed in the jig main body and held by a pair of self-lock washers at both sides with the hole section sandwiched therebetween;
   each of the pair of self-lock washers has an annular member and a plurality of flexible pieces formed at an inner circumferential side of the annular member;
   as the jig main body is sandwiched between the pair of self-lock washers in a state in which the pair of self-lock washers hold the blanket fixing pin, the blanket fixing pin is attached to the jig main body through pin coupling;
   the blanket fixing pin is held by the pair of self-lock washers so that the blanket fixing pin is attached to the jig main body with a first end side of the blanket fixing pin being capable of being displaced;
   the jig main body of the transport jig includes a strap which is band-shaped and extends in a vertical direction when the blanket unit is inserted between the inner tank and the outer tank;
   the blanket fixing pin includes a large diameter section formed in a second end side of the blanket fixing pin, the second end side being opposite to the first end side, such that the large diameter section has a diameter larger than that of the first end side of the blanket fixing pin;
   the pair of self-lock washers includes a first self-lock washer and a second self-lock washer; and
   the first self-lock washer is fitted onto the large diameter section of the blanket fixing pin, the first end side of the blanket fixing pin is inserted into an attachment hole of the strap, an outer circumferential section of the first self-lock washer abuts the strap, and the second self-lock washer is fitted onto the first end side of the blanket fixing pin and abuts the strap.

4. The blanket unit according to claim 3, wherein when the blanket fixing pin is inserted into an insertion hole of the self-lock washer, the plurality of flexible pieces are elastically deformed to allow the insertion of the blanket fixing pin, and then the blanket fixing pin is held by the plurality of flexible pieces according to elastic recovery of the plurality of flexible pieces.

* * * * *